US008814197B2

(12) United States Patent
Keatley

(10) Patent No.: US 8,814,197 B2
(45) Date of Patent: Aug. 26, 2014

(54) DROP-DOWN TILT STOP ASSEMBLY FOR FIFTH WHEEL ASSEMBLY

(71) Applicant: SAF-Holland, Inc., Holland, MI (US)

(72) Inventor: Justin Keatley, Zeeland, MI (US)

(73) Assignee: SAF-Holland, Inc., Holland, MI (US)

( * ) Notice: Subject to any disclaimer, the term of this patent is extended or adjusted under 35 U.S.C. 154(b) by 0 days.

(21) Appl. No.: 13/835,565

(22) Filed: Mar. 15, 2013

(65) Prior Publication Data

US 2013/0328287 A1 Dec. 12, 2013

Related U.S. Application Data

(60) Provisional application No. 61/658,125, filed on Jun. 11, 2012.

(51) Int. Cl.
*B62D 53/08* (2006.01)

(52) U.S. Cl.
USPC ........... 280/433; 280/439; 280/432; 280/507; 280/506

(58) Field of Classification Search
USPC .......................................... 280/433, 439, 423
See application file for complete search history.

(56) References Cited

U.S. PATENT DOCUMENTS

| | | | | |
|---|---|---|---|---|
| 4,241,934 A | * | 12/1980 | Buehner | 280/432 |
| 4,566,716 A | * | 1/1986 | Modat | 280/439 |
| 4,573,699 A | * | 3/1986 | Smith | 280/432 |
| 5,203,850 A | * | 4/1993 | Harrold | 280/438.1 |
| 6,056,309 A | * | 5/2000 | Brown | 280/447 |
| 6,581,951 B2 | * | 6/2003 | Lange | 280/440 |
| 2006/0070774 A1 | * | 4/2006 | Hammonds | 180/6.2 |

OTHER PUBLICATIONS

Holland, Fifth Wheel No-Tilt Installation Instructions. Published at least as early as Mar. 14, 2012.
Fontaine Parts Connection, Blocked fifth wheels sales sheet. Published at least as early as Mar. 14, 2012.
Jost, No-Tilt Convertible Brackets Brochure. Published at least as early as Mar. 14, 2012.

\* cited by examiner

*Primary Examiner* — Joseph M Rocca
*Assistant Examiner* — Marlon Arce
(74) *Attorney, Agent, or Firm* — Price Heneveld LLP

(57) ABSTRACT

According to the present invention, a fifth wheel hitch assembly includes a support bracket adapted to operably couple with a vehicle frame. The hitch assembly also has a hitch plate that includes a throat adapted to receive a kingpin of a trailer and a rear portion. The hitch plate is pivotably coupled with the support bracket and is pivotable between a first position and a second position. Further, the hitch assembly has a limiter linkage that includes a first end pivotably coupled with the rear portion. A second end of the limiter linkage is movable between a stowed and a deployed position. In the stowed position the second end is spaced from the vehicle frame. In the deployed position the second end of the limiter linkage is detachably coupled with the vehicle frame, thereby limiting movement of the hitch plate between the first and second positions.

20 Claims, 4 Drawing Sheets

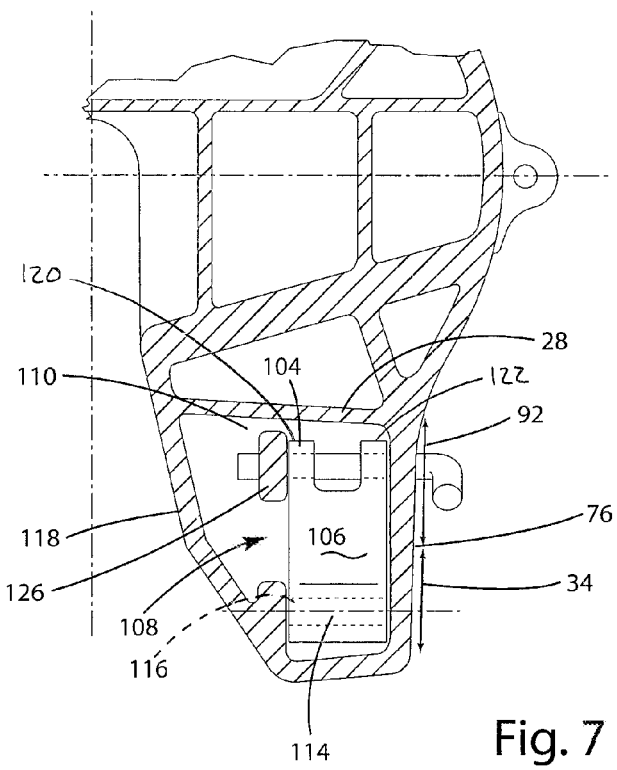
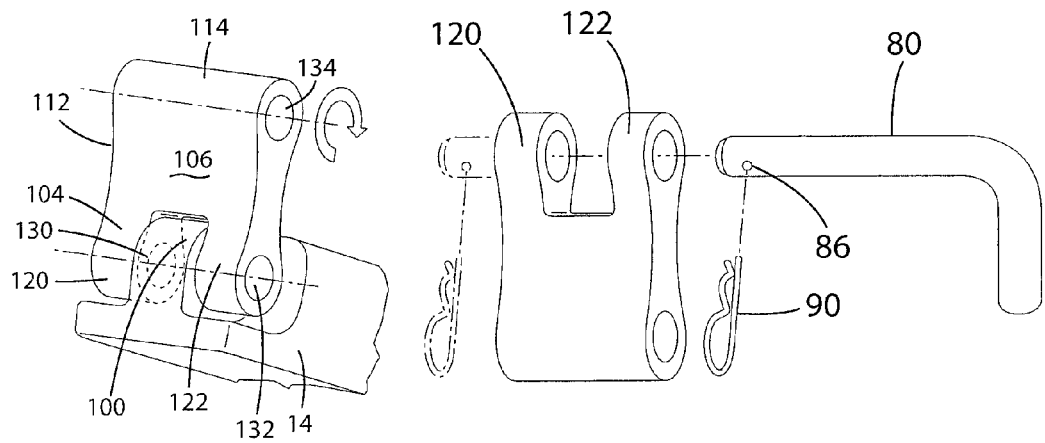
Fig. 7
Fig. 8
Fig. 9

DROP-DOWN TILT STOP ASSEMBLY FOR FIFTH WHEEL ASSEMBLY

FIELD OF THE INVENTION

The present invention generally relates to a fifth wheel hitch plate assemblies. More specifically, the invention relates to pivotable hitch plate assemblies, wherein the hitch plate pivots in relation to the vehicle frame.

BACKGROUND OF THE INVENTION

Fifth wheel hitch assemblies have been adapted to include hitch plates that are pivotable about a central portion thereof. Such pivotable motion has allowed the hitch plates to pivot with respect to a vehicle's frame when the vehicle is aligning and attaching with a trailer or when the vehicle and trailer are attached about the fifth wheel hitch assembly and traveling together.

BRIEF SUMMARY OF THE INVENTION

According to one aspect of the present invention, a fifth wheel hitch assembly includes a support bracket adapted to operably couple with a vehicle frame. The hitch assembly also includes a hitch plate that has a throat adapted to receive a kingpin of a trailer and a rear portion. The hitch plate is pivotably coupled with the support bracket and is pivotable between a first position and a second position. The hitch assembly further includes a limiter linkage having a first end pivotably coupled with the rear portion and a second end movable between a stowed position and a deployed position. In the stowed position the second end is spaced from the vehicle frame. In the deployed position the second end of the limiter linkage is detachably coupled with the vehicle frame, thereby limiting movement of the hitch plate between the first and second positions.

According to another aspect of the present invention, a fifth wheel hitch assembly includes a support bracket operably coupled to a vehicle frame member. The hitch assembly also includes a hitch plate pivotably coupled to the support bracket for pivoting movement between a first position and a second position. The hitch plate includes a throat adapted to receive a kingpin of a trailer, an intermediate portion pivotably coupled with the support bracket, and a rear portion having a first section and a second section, each extending rearwardly of the intermediate portion and juxtapositioned across the throat from one another. The hitch assembly further includes a limiter linkage having a first end pivotably coupled with the first section and a second end pivotable between a stowed position and a deployed position. In the stowed position the second end is spaced from the frame member. In the deployed position the second end is detachably coupled with the frame member, thereby restricting the pivotable movement of the hitch plate between the first and second positions.

According to yet another aspect to the present invention, a method for restricting pivotal movement of a hitch plate of a fifth wheel hitch assembly, includes providing a supportive vehicle frame member, a support bracket operably coupled to the frame member, and a hitch plate pivotably coupled to the support bracket for pivotal movement between the first and second positions. The method also includes providing a first limiter linkage having a first and second end, wherein the first limiter linkage is pivotably coupled at the first end of the first limiter linkage with a rear portion of the hitch plate. The first limiter linkage is pivoted from a stowed position, wherein the second end of the first limiter linkage is spaced from the frame member, to a deployed position, wherein the limiter linkage abuts the frame member. The first limiter linkage is detachably coupled with the frame member, thereby limiting the pivoting of the hitch plate between the first and second positions, and in doing so restricting pivotal movement of the hitch plate with respect to the vehicle frame.

According to another aspect of the present invention a fifth wheel hitch assembly includes a support bracket operably coupled to a vehicle frame member and a hitch plate pivotably coupled to the support bracket for pivotal movement between the first and second positions. A limiter linkage in a deployed position is coupled between a rear portion of a hitch plate and a vehicle frame member, thereby limiting pivotal movement of the hitch plate between the first and second positions. The limiter linkage aligns the hitch plate in a generally horizontal position with respect to the frame member, allowing the vehicle to align with a trailer and engage a kingpin of the trailer with a throat of the hitch plate. The limiter linkage, upon engagement of the kingpin with the throat of the hitch plate, may be detached from the vehicle frame and the limiter linkage may be pivoted into a stowed position. In the stowed position the trailer may pivot on the hitch plate with respect to the vehicle. Likewise, the kingpin may disengage more easily from the throat of the hitch plate when the limiter linkage is in the deployed position and detachably coupled with the vehicle frame member.

These and other features, advantages, and objects of the present invention will be further understood and appreciated by those skilled in the art by reference to the following specification, claims, and appended drawings.

BRIEF DESCRIPTION OF THE DRAWINGS

In the drawings:

FIG. 7 is a partial bottom plan view of a hitch plate of the present invention with the limiter linkage of FIG. 5;

FIG. 8 is a top perspective view of the limiter linkage of FIG. 5; and

FIG. 9 is an exploded side perspective view of the limiter linkage of FIG. 5.

DETAILED DESCRIPTION

Figure 1:
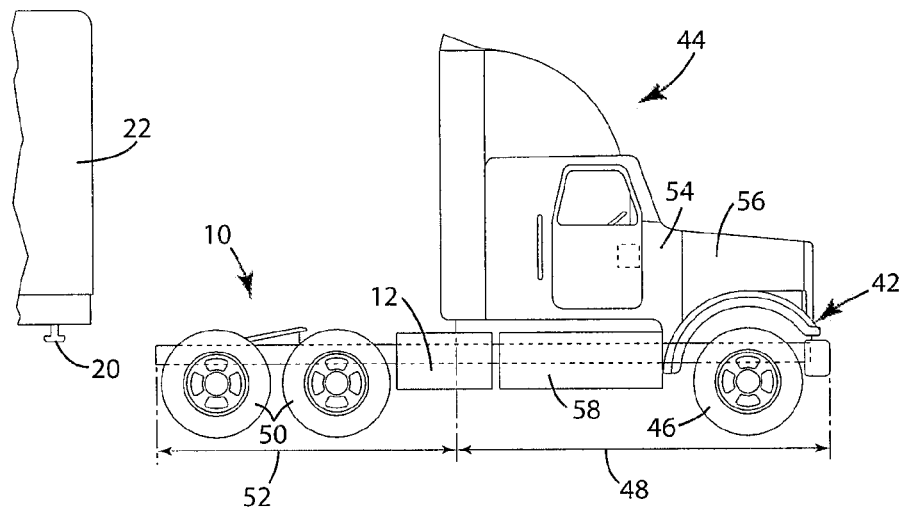
FIG. 1 is a side elevational view of a vehicle having a fifth wheel hitch assembly of the present invention.

For purposes of the description herein, the terms "upper," "lower," "right," "left," "rear," "front," "vertical," "horizontal," and derivatives thereof shall be related to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended drawings. Hence, specific dimensions and other physical characteristics relating to the embodiments disclosed therein are not to be considered to be limiting, unless the claims expressly state otherwise.

Referring now to FIGS. 1-9, the reference numeral 10 generally designates a fifth wheel hitch assembly that includes a vehicle frame member 12. A support bracket 14 is operably coupled to the frame member 12. A hitch plate 16 is pivotably coupled to the support bracket 14 for pivoting movement between a first position and a second position. The hitch plate 16 includes a throat 18 adapted to receive a kingpin 20 of a trailer 22, an intermediate portion 24 pivotably coupled with the support bracket 14, and a rear portion 26 having a first section 28 and a second section 30, each extending rearwardly of the intermediate portion 24 and juxtapositioned across the throat 18 from one another. A limiter linkage 32 has a first end 34 that is pivotably coupled with the first section 28. A second end 36 of the limiter linkage 32 is pivotable between a stowed position 38 and a deployed position 40. In the stowed position 38, the second end 36 is spaced from the frame member 12. In the deployed position 40, the second end 36 of the limiter linkage 32 is detachably coupled with the frame member 12, thereby restricting the pivotable movement of the hitch plate 16 between the first and second positions.

Referring now to FIG. 1, the frame member 12 extends along a bottom portion 42 of a vehicle 44. The frame member 12 is supported by two front wheels 46 at a front end 48 of the vehicle 44 and by eight rear wheels 50 at a rear end 52 of the vehicle 44. However, it is contemplated that more or fewer wheels may be included on the vehicle 44. The front end 48 of the vehicle 44 has a cab assembly 54, an engine 56, and fuel tanks 58 that are supported by the frame member 12. At the rear end 52 of the vehicle 44, the frame member 12 supports the fifth wheel hitch assembly 10 generally between the rear wheels 50. It is contemplated that the portion of the frame member 12 that supports the fifth wheel hitch assembly 10 may be a portion or a part of the illustrated frame member 12 of the vehicle 44.

Figure 2:
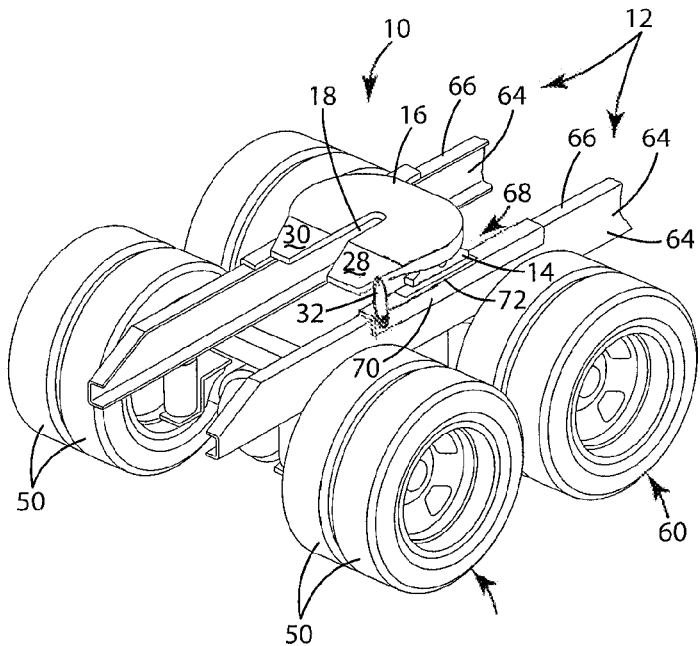
FIG. 2 is a top perspective view of a fifth wheel hitch assembly of the present invention on a vehicle frame.

As illustrated in FIG. 2, the fifth wheel hitch assembly 10 is coupled with the frame member 12 generally between a forward set 60 and a rearward set 62 of the rear wheels 50. The frame member 12 includes two parallel beams 64 extending from the rear end 52 to the front end 48 of the vehicle 44 (FIG. 1). The beams 64 are positioned inside the rear wheels 50, such that two wheels are laterally located outside the beams 64 on both sides of the frame member 12 for the forward and rearward sets 60, 62 of the rear wheel 50. The fifth wheel hitch assembly 10 is coupled with a top surface 66 of the beams 64 of the frame member 12 and generally centered laterally between the beams 64. It is contemplated that the fifth wheel hitch assembly 10 may be disposed at other locations along the rear end 52 of the frame member 12 (FIG. 1).

Still referring to FIG. 2, the support bracket 14 of the fifth wheel hitch assembly 10 is coupled with the top surface 66 of the beams 64 of the frame member 12. The hitch plate 16 is pivotably coupled with the support bracket 14, allowing the first and the second sections 28, 30 to extend rearwardly of the intermediate portion 24 (FIG. 4), substantially positioning the throat 18 of the hitch plate 16 in a center of and in parallel alignment with the beams 64 of the frame 12. In addition, a track assembly 68 may be secured between the fifth wheel hitch assembly 10 and the frame member 12, allowing the hitch plate 16 to be slidably positioned at various positions along the frame member 12. The track assembly 68 includes a rail 70 that is coupled with the frame member 12 and a slide 72 that is slidably engaged with the rail 70. The slide is coupled with the support bracket 14 of the fifth wheel hitch assembly 10. It is contemplated that the support bracket 14 may be fixedly coupled with the beams 64 of the frame member 12, without the track assembly 68.

Figure 3:
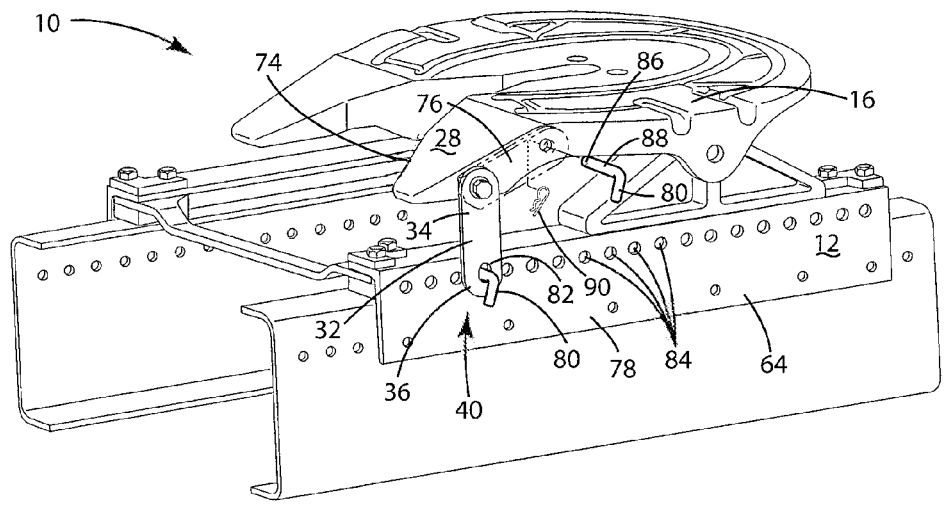
FIG. 3 is an enlarged partial top perspective view of a fifth wheel hitch assembly of the present invention illustrating a limiter linkage.

Referring now to FIG. 3, the limiter linkage 32 is illustrated in the deployed position 40, securing the hitch plate 16 to the frame member 12. The first end 34 of the limiter linkage 32 is pivotably coupled with a rearward portion 74 of an outwardly exposed surface 76 of the first section 28 of the hitch plate 16. The second end 36 of the limiter linkage 32 is readily detachably coupled with a side surface 78 of the beam 64 of the frame member 12. A locking pin 80 is used to detachably couple the second end 36 of the limiter linkage 32 to the frame member 12. When the limiter linkage 32 is aligned in the deployed position 40 relative to the frame member 12, the locking pin 80 engages an aperture 82 in the limiter linkage 32 as well as engaging a corresponding receiving hole 84 on the frame member 12. A series of receiving holes 84 are formed along the side surface 78 of the beam 64 to allow for coupling the limiter linkage 32 thereon at various positions, based upon the position of the hitch plate 16 along the track assembly 68 relative to the frame member 12.

As shown in FIG. 3, the locking pin 80 is cylindrical and L-shaped and has a pin hole 86 perpendicularly formed at an end portion 88 of the locking pin 80. Upon the end portion 88 engaging and extending through both the aperture 82 in the limiter linkage 32 and the receiving hole 84 on the frame member 12, a cotter pin 90 (FIG. 9) is inserted into the pin hole 86 on the locking pin 80, thereby preventing partial or complete removal of the locking pin 80 from the limiter linkage 32 by vibration or other forces that may result from operation of the vehicle 44 or movement of the trailer 22 (FIG. 1). The cotter pin 90 is made of a flexibly resilient material, such as hardened metal wire, so it releasably engages the pin hole 86 on the locking pin 80. It is conceivable, however, that another fastener may be used in place of the locking pin 80 to detachably couple the second end 36 of the limiter linkage 32 to the frame member 12.

Figure 4:
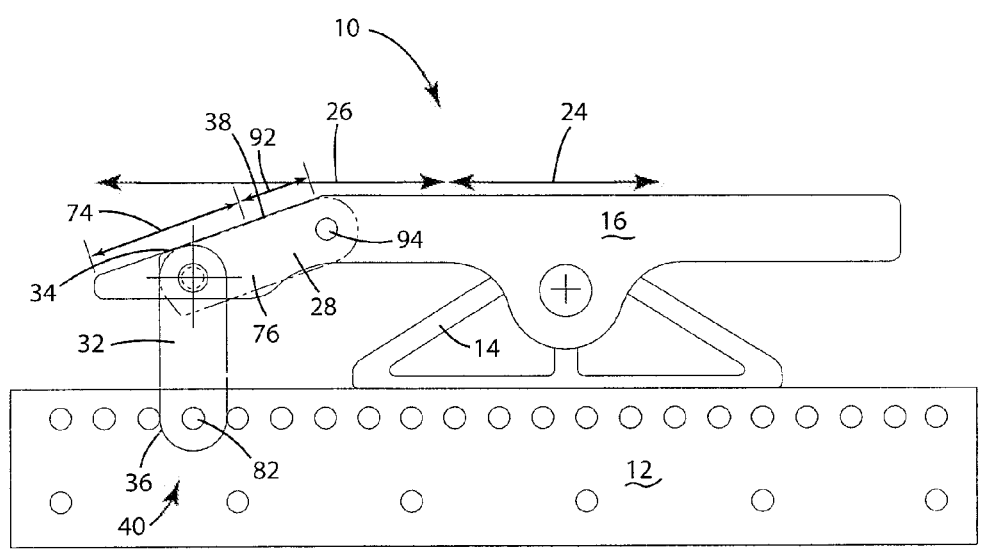
FIG. 4 is a side elevational view of a fifth wheel hitch assembly of the present invention illustrating a limiter linkage.

Referring now to FIG. 4, the limiter linkage 32 is substantially oval shaped, and in the deployed position 40, extends vertically and substantially orthogonally between the hitch plate 16 and the frame member 12. The limiter linkage 32 provides an additional connection between the hitch plate 16 and the frame member 12 rearward the pivotable connection between the hitch plate 16 and the support bracket 14. As such, with the limiter linkage 32 in the deployed position 40, wherein the second end 36 is detachably coupled with the frame member 12, the pivotable movement of the hitch plate 16 about the support bracket 14, between the first and second positions, is restricted by the limiter linkage 32. It is also contemplated that in the deployed position 40, the second end 36 of the limiter linkage 32, may alternatively be detachably coupled with the support bracket 14 to restrict pivotable movement of the hitch plate 16 with respect to the frame member 12.

As further illustrated in FIG. 4, the second end 36 of the limiter linkage 32 may readily be detached from the frame member 12, without the use of tools, and pivoted about the first end 34 of the limiter linkage 32 to the stowed position 38. In the stowed position 38, the second end 36 of limiter linkage 32 is detachably coupled with a forward portion 92 of the outwardly exposed surface 76 of the first section 28, proximate the throat 18 (FIG. 2) of the hitch plate 16, using the locking pin 80 (FIG. 3). To retain the limiter linkage 32 in the stowed position 38, the end portion 88 (FIG. 3) of the locking pin 80 (FIG. 3) engages both the aperture 82 in the limiter linkage 32 and a stowing hole 94 in the forward portion 92 of the first section 28 of the hitch plate 16. Thereafter, the cotter pin 90 (FIG. 3) is inserted into the pin hole 86 (FIG. 3) on the locking pin 80 (FIG. 3). In the stowed position 38, a longitudinal extent of the limiter linkage 32 is substantially aligned with a top surface 96 of the first section 28, permitting the trailer 22 (FIG. 1) to contact the top surface 96 of the first section 28 without contacting the limiter linkage 32 or disrupting the detachable coupling thereof. With the limiter linkage 32 detachably coupled in the stowed position 38, the pivotable movement of the hitch plate 16 about the support bracket 14 is not restricted by the limiter linkage 32.

Figure 5:
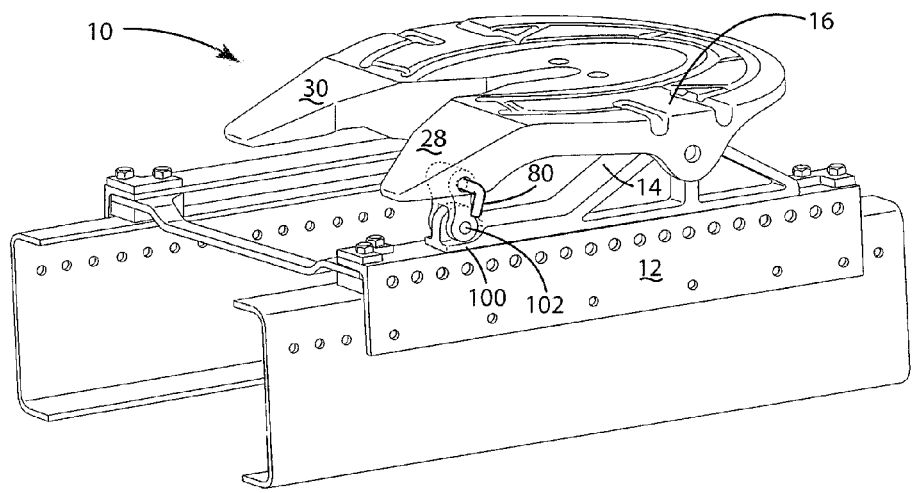
FIG. 5 is a partial top perspective view of an alternative embodiment of the fifth wheel hitch assembly of the present invention.

An alternative embodiment of the fifth wheel hitch assembly 10, as illustrated in FIG. 5, includes the support bracket 14 with an extension portion 100 projecting rearward from the support bracket 14 along the frame member 12. The extension portion 100 has a stabilizer hole 102 for securing the second end 104 (FIG. 6) of the limiter linkage 106 (FIG. 6) with the support bracket 14 to prevent pivotal movement of the hitch plate 16 with respect to the frame member 12. As shown, the limiter linkage 106 (FIG. 6) is in the stowed position 108 (FIG. 6), internally mounted and substantially concealed within a cavity 110 (FIG. 6) in the first section 28 of the hitch plate 16. In such position, the second end 104 (FIG. 6) of the limiter linkage 106 (FIG. 6) is attached within the cavity 110 (FIG. 6) with the locking pin 80. In the stowed position 108 (FIG. 6), the hitch plate 16 is free to pivot about the support bracket 14, between the first and second positions, with respect to the frame member 12. It is also contemplated that the limiter linkage 32 as illustrated in FIGS. 3-4 may be adapted to couple with the extension portion 100 of the embodiment.

Figure 6:
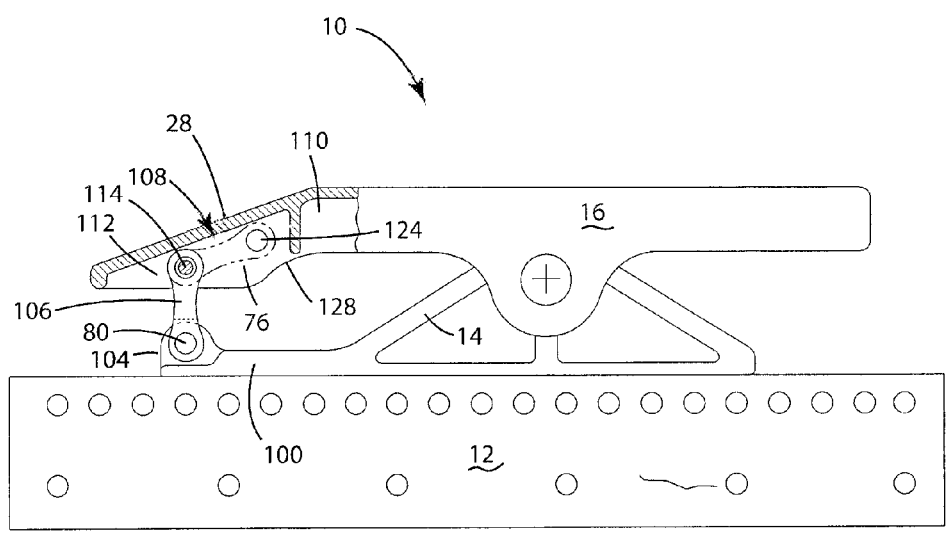
FIG. 6 is a side elevational view of the fifth wheel hitch assembly of FIG. 5 with a cut away portion illustrating the limiter linkage.

As shown in FIG. 6, the limiter linkage 106 of the alternative embodiment is in the deployed position 112 with the second end 104 detachably coupled with the extension portion 100 of the support bracket 14 with the locking pin 80. The first end 114 of the limiter linkage 106 is internally mounted and pivotably coupled within the cavity 110 in the first section 28. When the limiter linkage 106 is pivoted to the stowed position 108, the second end 104 of the limiter linkage 106 is substantially within the cavity 110, such that the a majority of the limiter linkage 106 is received within the cavity 110, and accordingly is not visible from a side view (FIG. 6).

Referring now to FIG. 7, the alternative embodiment of the fifth wheel hitch assembly is illustrated with the limiter linkage 106 in the stowed position 108. In the stowed position 108 the first end 114 of the limiter linkage 106 is pivotably coupled within the cavity 110 by a rod 116 extending from the rearward portion 74 of the outwardly exposed surface 76 of the first section 28 to an inside surface 118 of the first section 28. The second end 104 of the limiter linkage 106 has a first prong 120 and a second prong 122 that are readily detachably coupled within the cavity 110, proximate the throat 18 (FIG. 2) of the hitch plate 16, such that the locking pin 80 engages a stowing hole 124 (FIG. 6) in the forward portion 92 of the first section 28, the first and second prongs 120, 122, and an internal bracket 126 formed within the cavity 110. Upon engaging the same, the cotter pin 90 is inserted into the pin hole 86 on the locking pin 90. Further, the cavity 110 formed on a bottom side 128 (FIG. 6) of the first section 28, and the cavity 110 conforms substantially to the shape of the first section 28. However, it is contemplated that the cavity 110 has any configuration that can receive the limiter linkage 106 in the stowed position 108.

As shown in FIG. 8, the second end 104 of the limiter linkage 106 is illustrated in the deployed position 112, detachably coupled with the support bracket 14. The first and second pongs 120, 122 on the second end 104 of the limiter linkage 106 are spaced apart by a gap large enough to receive the extension portion 100 of the support bracket 14. A first eyelet 130 and a second eyelet 132 are respectively formed in the first and second prongs 120, 122 to receive the locking pin 80 (FIG. 7). The first end 114 of the limiter linkage 106 has a barrel shape with a cylindrical channel 134 formed therein for receiving the rod 116 (FIG. 7) for pivotably coupling the limiter linkage 106 with the hitch plate 16. More specifically, the rod 116 has a cylindrical shape and extends within the cylindrical channel 134 of the first end 114 of the limiter linkage 106 (FIG. 7), allowing pivotably movement of the limiter linkage 106 (FIG. 7) with respect to the hitch plate 16.

As illustrated in FIG. 9, the locking pin 80, as also shown in FIGS. 3 and 7 and previously discussed, readily detachably couples the second end 104 of the limiter linkage 106 to the first section 28 of the hitch plate 16 (FIG. 7) about the first and second eyelets 130, 132 formed in the first and second prongs 120, 122. The locking pin 80 is prevented from being removed from the eyelets 130, 132 by vibration or other forces by inserting the cotter pin 90 in the pin hole 86 formed perpendicularly at the end portion 88 of the locking pin 80. It is also contemplated that another limiter linkage may be similarly located between the second section 30 (FIG. 5) of the hitch plate and either the frame member 12 or the support bracket 14 to provide another rearward connection point on the hitch plate 16 to restrict pivotal movement of the hitch plate 16 about the support bracket 14 relative to the frame member 12.

A method for restricting pivotal movement of the hitch plate 16 of the fifth wheel hitch assembly 10 includes providing the supportive vehicle frame member 12, the support bracket 14 operably coupled to the frame member 12, and the hitch plate 16 pivotably coupled to the support bracket 14 for pivotal movement between a first position and a second position. The method also includes providing the first limiter linkage 32 having the first and second end 34, 36, wherein the first limiter linkage 32 is pivotably coupled at the first end 34 of the first limiter linkage 32 with a rear portion 26 of the hitch plate 16. The method goes on to include pivoting the first limiter linkage 32 from the stowed position 38, wherein the second end 36 of the first limiter linkage 32 is spaced from the frame member 12, to the deployed position 40, wherein the first limiter linkage 32 abuts the frame member 12. The method also includes detachably coupling the first limiter linkage 32 with the frame member 12, thereby limiting the pivoting of the hitch plate 16 between the first and second positions, and in doing so restricting pivotal movement of the hitch plate 16 with respect to the vehicle frame member 12. The method may also include the first end 34 of the first limiter linkage 32 pivotably coupling with the hitch plate 16 proximate the throat 18, which is adapted to receive a kingpin 20 therein. The method may also include the first end 34 of the limiter linkage 36 pivotably coupling within a cavity 110 on a bottom side 128 of the hitch plate 16. It is also contemplated that the method includes providing a second limiter linkage coupled to the hitch plate 16 proximate the throat 18 and juxtapositioned across the throat 18 from the first limiter linkage 32.

In the forgoing description it will be readily appreciated by those skilled in the art that modifications may be made to the invention without departing from the concepts as disclosed herein. Such modifications are to be considered as included in the following claims, unless these claims by their express language state otherwise.

The invention claimed is:

1. A fifth wheel hitch assembly, comprising:
   a support bracket adapted to operably couple with a vehicle frame;
   a hitch plate that includes a throat adapted to receive a kingpin of a trailer and a rear portion, wherein the hitch plate is pivotably coupled with the support bracket, wherein the hitch plate is pivotable between a first position and a second position; and
      a limiter linkage having a first end pivotably coupled with the rear portion and a second end pivotable between a stowed position, wherein the second end is spaced from the vehicle frame, and a deployed position, wherein the second end of the limiter linkage is detachably coupled with the vehicle frame, thereby limiting movement of the hitch plate between the first and second positions.

2. The fifth wheel hitch assembly of claim 1, wherein the second end of the limiter linkage is readily detachably coupled with the rear portion of the hitch plate when the limiter linkage is in the stowed position.

3. The fifth wheel hitch assembly of claim 1, further comprising:
   a locking pin that detachably couples the second end of the limiter linkage to the vehicle frame when the second end of the limiter linkage is in the deployed position.

4. The fifth wheel hitch assembly of claim 2, further comprising:
   a locking pin that detachably couples the second end of the limiter linkage to the hitch plate proximate the throat of the hitch plate when the second end of the limiter linkage is in the stowed position.

5. The fifth wheel hitch assembly of claim 1, wherein the first end of the limiter linkage is pivotably coupled with an outwardly exposed surface of the rear portion of the hitch plate.

6. The fifth wheel hitch assembly of claim 1, wherein the hitch plate further includes a cavity formed on a bottom side of the rear portion, and wherein the first end of the limiter linkage is pivotably coupled to the hitch plate within the cavity.

7. The fifth wheel hitch assembly of claim 6, wherein a majority of the limiter linkage is positioned within the cavity when the limiter linkage is in the stowed position.

8. The fifth wheel hitch assembly of claim 1, wherein the second end of the limiter linkage is detachably coupled with the support bracket in the deployed position, thereby restricting movement of the hitch plate between the first and second positions.

9. A fifth wheel hitch assembly, comprising:
   a vehicle frame member;
   a support bracket operably coupled to the frame member;
   a hitch plate pivotably coupled to the support bracket for pivoting movement between a first position and a second position, comprising:
      a throat adapted to receive a kingpin of a trailer;
      an intermediate portion pivotably coupled with the support bracket;
      a rear portion having a first section and a second section, each extending rearwardly of the intermediate portion and juxtapositioned across the throat from one another; and
   a limiter linkage having a first end pivotably coupled with one of the first section or the second section and a second end pivotable between a stowed position, wherein the second end is spaced from the frame member, and a deployed position, wherein the second end is detachably coupled with the frame member, thereby restricting the pivotable movement of the hitch plate between the first and second positions.

10. The fifth wheel hitch assembly of claim 9, wherein the second end of the limiter linkage is detachably coupled with the first section of the hitch plate when the limiter linkage is in the stowed position.

11. The fifth wheel hitch assembly of claim 10, further comprising:
    a locking pin that detachably couples the second end of the limiter linkage to at least a select one of the first section and second section of the hitch plate when the second end of the limiter linkage is in the stowed position.

12. The fifth wheel hitch assembly of claim 9, further comprising:
    a locking pin that detachably couples the second end of the limiter linkage to the frame member when the second end of the limiter linkage is in the deployed position.

13. The fifth wheel hitch assembly of claim 9, wherein the first end of the limiter linkage is pivotably coupled with an outwardly exposed surface of at least a select one of the first section and second section.

14. The fifth wheel hitch assembly of claim 9, wherein the hitch plate further includes a cavity formed on a bottom side of at least one of the first section and second section of the hitch plate, and wherein the first end of the limiter linkage is pivotably coupled within the cavity.

15. The fifth wheel hitch assembly of claim 14, wherein a majority of the limiter linkage is received within the cavity when the limiter linkage is in the stowed position.

16. The fifth wheel hitch assembly of claim 9, wherein the second end of the limiter linkage is detachably coupled with the support bracket in the deployed position.

17. A method for restricting pivotal movement of a hitch plate of a fifth wheel hitch assembly, comprising:
    providing a vehicle frame member that supports;
    providing a support bracket operably coupled to the frame member;
    providing a hitch plate pivotably coupled to the support bracket for pivotal movement between a first position and a second position;
    providing a first limiter linkage having a first and second end, wherein the first limiter linkage is pivotably coupled at the first end of the first limiter linkage with a rear portion of the hitch plate;
    pivoting the first limiter linkage from a stowed position, wherein the second end of the first limiter linkage is spaced from the frame member, to a deployed position, wherein the first limiter linkage abuts the frame member; and
    detachably coupling the first limiter linkage with the frame member, thereby limiting the pivoting of the hitch plate between the first and second positions, and in doing so restricting pivotal movement of the hitch plate with respect to the vehicle frame member.

18. The method of claim 17, wherein the first end of the first limiter linkage is pivotably coupled with the hitch plate proximate a throat, and wherein the throat is adapted to receive a kingpin therein.

19. The method of claim 18, further comprising:
    providing a second limiter linkage coupled to the hitch plate proximate the throat and juxtapositioned across the throat from the first limiter linkage.

20. The method of claim 17, wherein the first end of the limiter linkage is pivotably coupled within a cavity on a bottom side of the hitch plate.

* * * * *